(12) United States Patent
Nakanishi et al.

(10) Patent No.: US 8,486,583 B2
(45) Date of Patent: Jul. 16, 2013

(54) FUEL CELL WITH ELECTRODE HAVING AN ELECTRICALLY CONDUCTIVE NANO-COLUMN AND PRODUCTION METHOD THEREOF

(75) Inventors: Haruyuki Nakanishi, Susono (JP); Chikashi Inazumi, Kyoto (JP); Yuki Sairyo, Suita (JP); Momoyo Sawai, Kobe (JP); Kenji Yoshikawa, Izumi (JP); Tomoya Yamashita, Osaka (JP)

(73) Assignees: Toyota Jidosha Kabushiki Kaisha, Toyota-shi, Aichi-ken (JP); Hitachi Zosen Corporation, Osaka-shi, Osaka-fu (JP)

( * ) Notice: Subject to any disclaimer, the term of this patent is extended or adjusted under 35 U.S.C. 154(b) by 906 days.

(21) Appl. No.: 12/293,667

(22) PCT Filed: Mar. 15, 2007

(86) PCT No.: PCT/IB2007/000639
§ 371 (c)(1),
(2), (4) Date: Sep. 19, 2008

(87) PCT Pub. No.: WO2007/107832
PCT Pub. Date: Sep. 27, 2007

(65) Prior Publication Data
US 2010/0075201 A1      Mar. 25, 2010

(30) Foreign Application Priority Data
Mar. 20, 2006   (JP) .................................. 2006-077494

(51) Int. Cl.
*H01M 4/02* (2006.01)

(52) U.S. Cl.
USPC .......................................... 429/523; 429/532

(58) Field of Classification Search
USPC ............................................................ 429/44
See application file for complete search history.

(56) References Cited

U.S. PATENT DOCUMENTS

| 5,879,828 | A | 3/1999 | Debe et al. | |
|---|---|---|---|---|
| 2002/0177032 | A1 | 11/2002 | Suenaga et al. | |
| 2004/0018416 | A1* | 1/2004 | Choi et al. | 429/44 |
| 2004/0170884 | A1 | 9/2004 | Frank et al. | |
| 2006/0269827 | A1* | 11/2006 | Liu et al. | 429/44 |
| 2007/0166603 | A1 | 7/2007 | Nakanishi et al. | |

(Continued)

FOREIGN PATENT DOCUMENTS

| EP | 1 383 186 A1 | 10/2004 |
|---|---|---|
| JP | 2001-520444 A | 10/2001 |

(Continued)

OTHER PUBLICATIONS

Office Action issued Sep. 27, 2011 in Japanese Priority Application No. 2006-077494 and partial English translation thereof.

(Continued)

*Primary Examiner* — Ula C Ruddock
*Assistant Examiner* — Jacob Marks
(74) *Attorney, Agent, or Firm* — Kenyon & Kenyon LLP

(57) ABSTRACT

In a fuel cell including an electrolyte membrane and a pair of electrodes disposed on both sides of the electrolyte membrane, at least one of the electrodes has an electrically conductive nanocolumn that is oriented with an inclination of 60° or less with respect to a planar direction of the electrolyte membrane, a catalyst supported on the electrically conductive nanocolumn, and an electrolyte resin coating the electrically conductive nanocolumn.

11 Claims, 3 Drawing Sheets

U.S. PATENT DOCUMENTS

2008/0096094 A1     4/2008    Nakanishi
2009/0075157 A1*   3/2009    Pak et al. ........................ 429/44

FOREIGN PATENT DOCUMENTS

| | | |
|---|---|---|
| JP | 2002-298861 A | 10/2002 |
| JP | 2005-4967 A | 1/2005 |
| JP | 2005-203332 A | 7/2005 |
| JP | 2005-302305 A | 10/2005 |
| JP | 2006-066187 A | 3/2006 |
| WO | WO 99/65821 A1 | 12/1999 |

OTHER PUBLICATIONS

Siroma, et al.: *Effect of the Membrane Thickness on the Ionic Conductivity of Recast Nafion Membranes*, The Cell Symposium 3C10 (2003).

Wenzhen Li, et al.: *Carbon nanotube film by filtration as cathode catalyst support for proton-exchange membrane fuel cell*, Langmuir, vol. 21, Oct. 11, 2005, pp. 9386-9389.

* cited by examiner

FUEL CELL WITH ELECTRODE HAVING AN ELECTRICALLY CONDUCTIVE NANO-COLUMN AND PRODUCTION METHOD THEREOF

This is a 371 national phase application of PCT/IB2007/000639 filed 15 Mar. 2007, claiming priority to Japanese Patent Application No. 2006-077494 filed 20 Mar. 2006, the contents of which are incorporated herein by reference.

FIELD OF THE INVENTION

The invention relates to a fuel cell and a production method for a fuel cell.

BACKGROUND OF THE INVENTION

Fuel cells directly convert chemical energy into electric energy by supplying a fuel and an oxidant to two electrically connected electrodes and electrochemically causing oxidation of the fuel. Therefore, the fuel cells, unlike heat engines of fire power plants and the like, are free from the restrictions of the Carnot cycle, and exhibits high energy conversion efficiency. Ordinarily, the fuel cells are constructed by stacking a plurality of unit cells that have, as a basic structure, a membrane-electrode assembly formed by sandwiching an electrolyte membrane between a pair of electrodes. In particular, a solid polymer electrolyte fuel cell incorporating a solid polymer electrolyte membrane as an electrolyte membrane is drawing attention particularly as a power source for portable or mobile appliances due to its advantages of being easy to miniaturize, being operable at low temperature, etc.

On the anode (fuel electrode) in the solid polymer electrolyte fuel cell, the reaction of the formula (1) progresses.

$$H_2 \rightarrow 2H^+ + 2e^- \quad (1)$$

The electrons generated in the reaction of the formula (1) move through an external circuit, and reach the cathode (oxidant electrode) after doing work in a load provided outside. The protons generated in the reaction of the formula (1) move in a hydrated form within a solid polymer electrolyte membrane from the anode side to the cathode side due to electroosmosis. Then, on the cathode, the reaction of the formula (2) progresses.

$$4H^+ + O_2 + 4e^- \rightarrow 2H_2O \quad (2)$$

Generally, a solid polymer electrolyte fuel cell has a structure in which electrodes each having a catalyst layer that contains carbon-based particles of carbon black or the like loaded with a catalyst, such as platinum or the like, and that also contains an electrolyte resin, and a gas diffusion layer made of an electrically conductive porous body, such as a carbon cloth or the like, are disposed on both sides of an electrolyte membrane (see FIG. 3). When the reaction of the formula (1) progresses on the catalyst in the anode of the solid polymer electrolyte fuel cell, the protons generated from hydrogen move through the electrolyte resin to the electrolyte membrane, and then reach the cathode. Then, the protons that have reached the cathode move through the electrolyte resin to the catalyst in the cathode. On the other hand, the electrons generated from hydrogen at the anode move through the carbon-based particles to the current collector, and pass through the external circuit and reach the cathode, and then move along carbon-based particles to the catalyst in the cathode.

Each of these electrochemical reactions in the anode and the cathode actively progresses at an interface where there coexist three phases: the catalyst that accelerates the reaction, the carbon-based particles that conduct electrons, and the electrolyte resin that conducts protons. The reactions in the anode-side and cathode-side catalyst layers become more active and therefore the power generation performance of the cell becomes higher the greater the amount of the catalyst that is supported on carbon particles. However, since the catalyst used in the fuel cell is a noble metal such as platinum or the like, there is a problem of the production cost of the fuel cell increasing if the amount of the catalyst supported is increased.

In the reaction electrodes in which the catalyst is supported on carbon particles, loss in the electron conduction occurs between carbon particles, and between a carbon particle and a separator that is a current collector. This electron loss is considered a cause of a performance ceiling in the electric power generation. Therefore, three of the present inventors, and others have developed a fuel cell as shown in FIG. 4 whose electrode has a structure in which carbon nanotubes are oriented substantially vertically to an electrolyte membrane, and surfaces of the carbon nanotubes are loaded with a catalyst, and are coated with an electrolyte resin (Japanese Patent Application Publication No. JP-A-2005-4967). The electrode having the structure in which carbon nanotubes are vertically oriented is excellent in electron conductivity, and restrains the electron loss in comparison with the case where the catalyst is supported on carbon particles. Therefore, the power generation efficiency per catalyst weight improves.

However, it has been reported that the electrolyte resin adjacent to the catalyst needs to have a certain membrane thickness in order that the protons generated on the catalyst move (e.g., see "Membrane Thickness Dependency of the Cast Nafion Thin Membrane Ion Conductivity" Shiroma et al, the Cell Symposium 3C10 (2003)). Thus, if the thickness of the electrolyte resin applied to a carbon nanotube surface is thin, there is a greater resistance to movement of the protons which are generated on the catalyst supported relatively close to an end portion of the carbon nanotube opposite from the side that is in contact with the electrolyte membrane, and which move through the electrolyte membrane applied thinly on the carbon nanotube surface to reach the electrolyte membrane. Likewise, if the thickness of the electrolyte resin applied to a carbon nanotube surface is thin, there is a greater resistance to the protons moving from the electrolyte membrane through the electrolyte resin applied thinly on the carbon nanotube surface to reach the catalyst supported relatively close to an end portion of the carbon nanotube opposite from the side thereof that is in contact with the electrolyte membrane.

If the conductivity of protons from the catalyst present at a location remote from the electrolyte membrane or to the catalyst is low, the catalyst supported on the carbon nanotubes which effectively contributes to the electrode reactions is limited to the catalyst supported on a side portion of each carbon nanotube that is in contact with the electrolyte membrane, and thus the catalyst utilization efficiency declines. As a method for restraining the decline of the catalyst utilization rate, Japanese Patent Application Publication No. JP-A-2005-4967 describes an arrangement in which the catalyst is supported on a side of a carbon nanotube that is in contact with the electrolyte membrane. However, in this method, while the catalyst utilization rate improves, the power generation efficiency per unit volute of the fuel cell is constrained.

Furthermore, an attempt to improve the proton conductivity by filling the spaces of the vertically oriented carbon nanotubes with an electrolyte resin faces a problem of the gas diffusivity declining so that the reactant gas fails to reach the catalyst.

DISCLOSURE OF THE INVENTION

It is an object of the invention to provide a fuel cell in which the power generation efficiency per unit weight of the catalyst and the power generation efficiency per unit volume of the fuel cell are improved by making such an arrangement that the catalyst present at a location remote from the electrolyte membrane contributes to the electrode reactions as well, and a production method for the fuel cell.

A first aspect of the invention relates to a fuel cell. This fuel cell includes an electrolyte membrane and a pair of electrodes disposed on both sides of the electrolyte membrane. At least one of the electrodes has an electrically conductive nanocolumn that is oriented with an inclination of 60° or less with respect to a planar direction of the electrolyte membrane, a catalyst supported on the electrically conductive nanocolumn, and an electrolyte resin coating the electrically conductive nanocolumn.

Since the electrically conductive nanocolumn supporting the catalyst and coated with the electrolyte resin is oriented with an inclination of 60° or less with respect to of the planar direction of the electrolyte membrane, the intervals between adjacent electrically conductive nanocolumns become narrow so that the electrolyte resin layers on the individual electrically conductive nanocolumns contact each other. In consequence, the movement of protons from the catalyst supported on an electrically conductive nanocolumn to the electrolyte membrane, and the movement of protons from the electrolyte membrane to the catalyst supported on the electrically conductive nanocolumn occur not only via the electrolyte resin on the electrically conductive nanocolumn supporting the catalyst concerned, but also via the electrolyte resin on an electrically conductive nanocolumn adjacent to the electrically conductive nanocolumn concerned. Thus, the proton conductivity improves. Besides, since the distance between the electrolyte membrane and a distal end of the electrically conductive nanocolumn opposite from the electrolyte membrane shortens, the resistance to the conduction of protons declines. Hence, according to the fuel cell of this aspect, since the catalyst supported near the far-side distal end of the electrically conductive nanocolumn away from the electrolyte membrane also works effectively in the electrode reactions, the power generation efficiency per unit weight of the catalyst is heightened, and furthermore, the power generation efficiency per unit volume of the entire fuel cell is also heightened.

An end of the electrically conductive nanocolumn may be embedded in the electrolyte membrane, from the viewpoint of a characteristic for the junction between the electrolyte membrane and the electrically conductive nanocolumn. Furthermore, the electrically conductive nanocolumn may have, on an outer surface thereof, an amorphous layer, because the amorphous layer can support an increased amount of catalyst and can uniformly support the catalyst. Examples of the electrically conductive nanocolumn include a carbon nanotube.

A thickness of the amorphous layer may be greater than or equal to 0.5 nm and less than or equal to 10 nm. Furthermore, a thickness of the amorphous layer may be greater than or equal to 1 nm and less than or equal to 3 nm.

The electrically conductive nanocolumn may be an electrically conductive material whose column diameter is greater than or equal to 5 nm and less than or equal to 50 nm, and whose length is greater than or equal to 10 µm and less than or equal to 80 µm, and whose aspect ratio is greater than or equal to 500 and less than or equal to 10,000.

At least one of the electrodes may have an electrically conductive nanocolumn that is oriented with an inclination that is greater than or equal to 1° and less than or equal to 35° with respect to the planar direction of the electrolyte membrane. Furthermore, the inclination may be greater than or equal to 10° and less than or equal to 30°.

The electrolyte resin may be a fluorine-based electrolyte resin. This fluorine-based electrolyte resin may be a perfluorocarbon sulfonic acid resin.

The electrolyte resin may be a hydrocarbon polymer that has a proton conductive group in a side chain.

A second aspect of the invention relates to a production method for a fuel cell. This production method for a fuel cell includes: an electrically conductive nanocolumn growth step of growing on a substrate an electrically conductive nanocolumn that is oriented substantially vertically to a planar direction of the substrate; a catalyst support step of supporting a catalyst on the electrically conductive nanocolumn; an electrolyte resin application step of applying a perfluorocarbon sulfonic acid resin to the electrically conductive nanocolumn supporting the catalyst; and a thermal transfer step of thermally transferring the electrically conductive nanocolumn supporting the catalyst on the substrate to the perfluorocarbon sulfonic acid resin membrane under conditions including a heating temperature of 140° C. to 160° C., an applied pressure of 1 MPa to 5 MPa, and a transfer time of 10 minutes to 30 minutes.

A third aspect of the invention relates to a production method for a fuel cell. This production method for a fuel cell includes: growing on a substrate an electrically conductive nanocolumn that is oriented substantially vertically to a planar direction of the substrate; supporting a catalyst on the electrically conductive nanocolumn; and thermally transferring the electrically conductive nanocolumn supporting the catalyst on the substrate to the electrolyte membrane so that the electrically conductive nanocolumn is oriented with an inclination of 60° or less with respect to a planar direction of the electrolyte membrane.

In the thermal transfer, a heating temperature may be greater than or equal to 120° C. and less than or equal to 170° C., and an applied pressure may be greater than or equal to 1 MPa and less than or equal to 10 MPa, and a time during which the heating temperature and the applied pressure are maintained may be greater than or equal to 1 minute and less than or equal to 30 minutes.

The electrolyte membrane may be made of a perfluorocarbon sulfonic acid resin, and the heating temperature may be greater than or equal to 140° C. and less than or equal to 160° C., and the applied pressure may be greater than or equal to 1 MPa and less than or equal to 5 MPa, and the time during which the heating temperature and the applied pressure are maintained may be greater than or equal to 10 minutes and less than or equal to 30 minutes.

This production method for the fuel cell may further include applying an electrolyte resin to the electrically conductive nanocolumn supporting the catalyst.

In the fuel cell of the first aspect of the invention, not only the catalyst supported near the end of the electrically conductive nanocolumn that is relatively close to the electrolyte membrane, but also the catalyst supported near the end that is relatively remote from the electrolyte membrane works effectively in the electrode reactions. Therefore, in this fuel cell, the utilization efficiency of the catalyst is high, and the amount of catalyst that effectively works is large. Hence, this fuel cell is excellent in the power generation efficiency of the entire fuel cell. Therefore, according to the fuel cell of the invention, the power generation efficiency can be improved, and the cost for production of the fuel cell required by the use of catalyst can be cut down.

A first aspect of the invention relates to a fuel cell. This fuel cell is a fuel cell including an electrolyte membrane and a pair of electrodes disposed on both sides of the electrolyte membrane, in which at least one of the electrodes has an electrically conductive nanocolumn that is oriented with an inclination of 60° or less with respect to a planar direction of the electrolyte membrane, a catalyst supported on the electrically conductive nanocolumn, and an electrolyte resin coating the electrically conductive nanocolumn.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
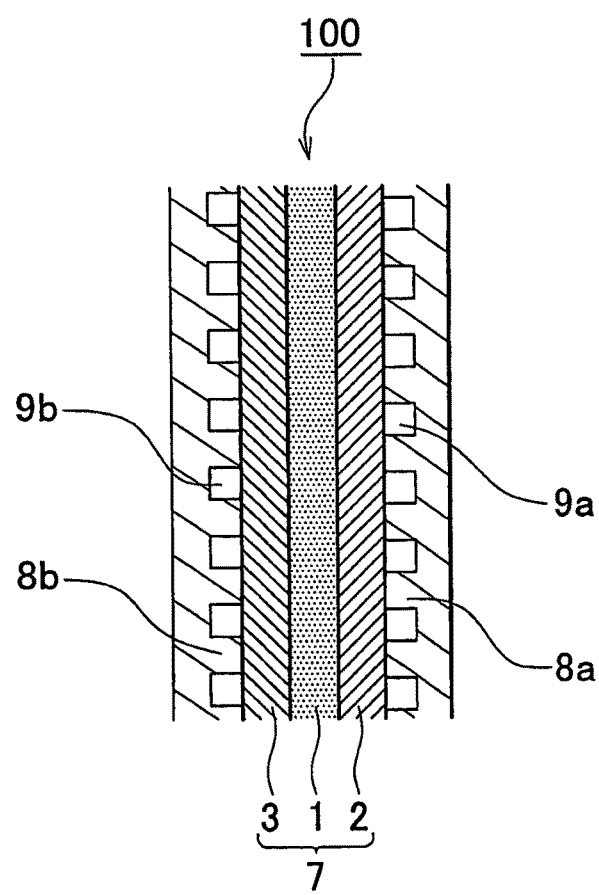
FIG. 1 is a schematic sectional view of a fuel cell of a first embodiment of the invention taken on a plane extending in the stacking direction of unit cells.
Figure 2:
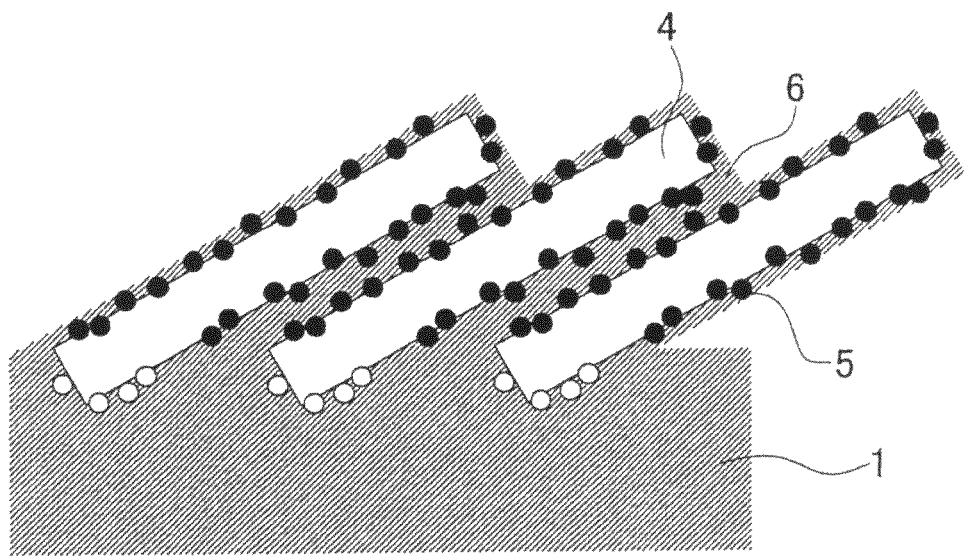
FIG. 2 is an enlarged partial view of the fuel cell of the first embodiment shown in FIG. 1.
Figure 3:
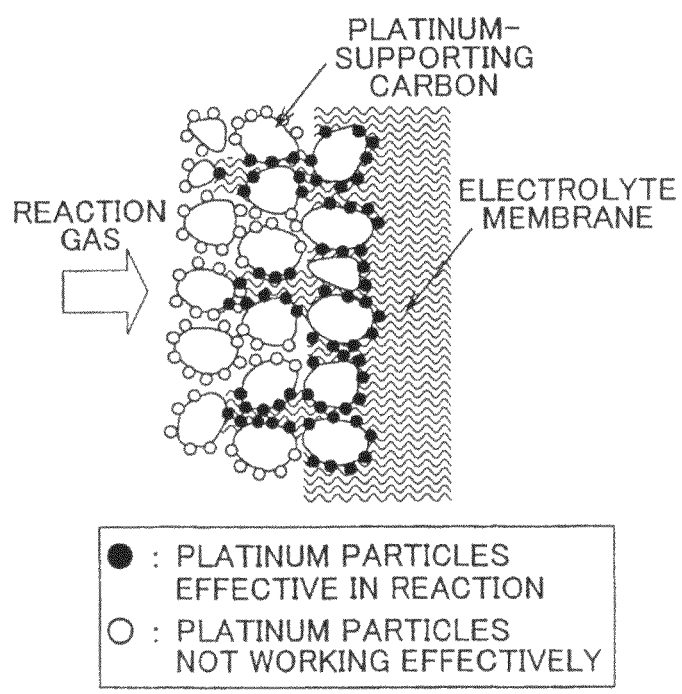
FIG. 3 is a diagram showing an example form of the fuel cell in which a catalyst is supported on carbon-based particles.
Figure 4:
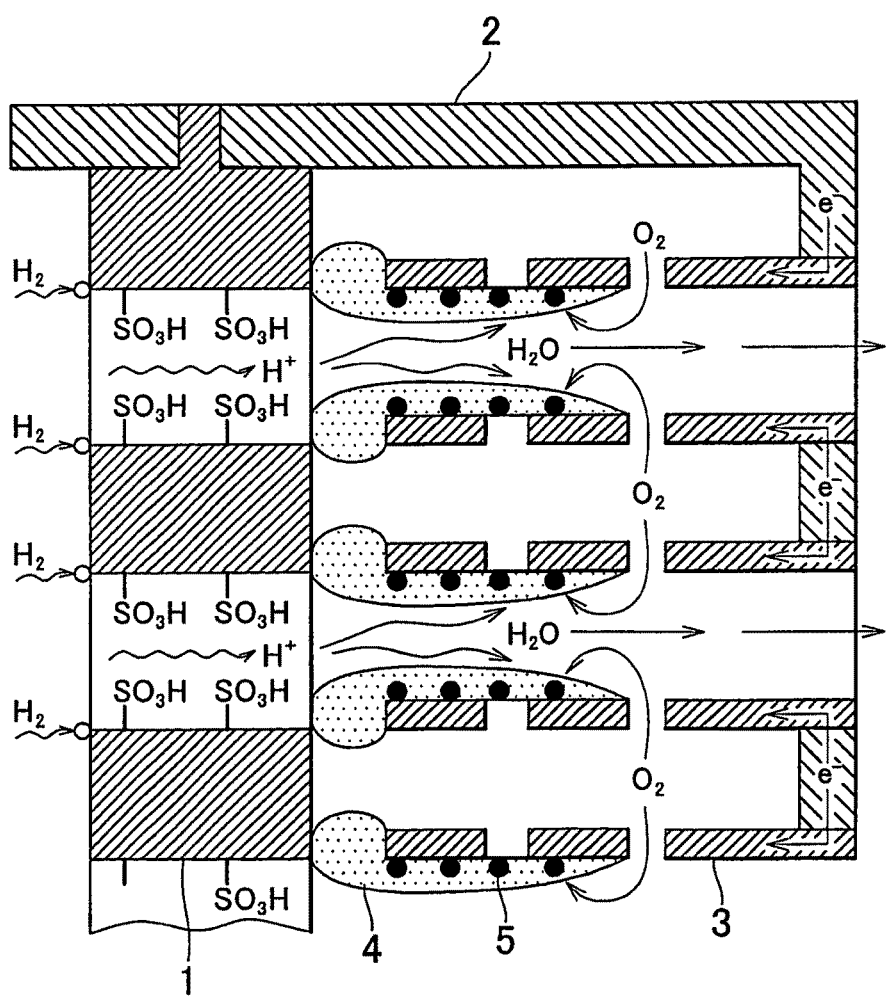
FIG. 4 is a diagram showing an example form of the fuel cell in which carbon nanotubes supporting the catalyst are vertically oriented.

A fuel cell in accordance with a first embodiment of the invention will be described with reference to FIGS. 1 and 2. FIG. 1 is a sectional view of a unit cell that constitutes a fuel cell in accordance with this embodiment, taken on a plane that extends in the stacking direction of unit cells. FIG. 2 is an enlarged partial view of an electrode and an electrolyte membrane of the fuel cell of this embodiment. Incidentally, the fuel cell of the invention is not limited to this embodiment.

In FIG. 1, a membrane-electrode assembly 7 is made up of a solid polymer electrolyte membrane (hereinafter, sometimes referred to simply as "electrolyte membrane") 1, an anode 2 disposed on one of two surfaces of the electrolyte membrane 1, and a cathode 3 disposed on the other surface of the electrolyte membrane. Furthermore, the membrane-electrode assembly 7 is sandwiched by an anode-side separator 8a and a cathode-side separator 8b, thus constructing a unit cell 100.

A side surface of one of the anode-side separator 8a and the cathode-side separator 8b has grooves that form reactant gas (fuel gas, oxidant gas) channels 9a, 9b. These grooves, an outer surface of the anode 2 and an outer surface of the cathode 3 define the fuel gas channel 9a and the oxidant gas channel 9b. The fuel gas channel 9a is a channel for supplying a fuel gas (a gas that contains or generates hydrogen) to the anode 2. The oxidant gas channel 9b is a channel for supplying an oxidant gas (a gas that contains or generates oxygen) to the cathode 3. The anode-side separator 8a and/or the cathode-side separator 8b may have a groove (not shown) that forms a cooling water channel, on a surface opposite from the surface where the groove for the reactant gas channel is formed.

In the fuel cell of the embodiment, at least one of the anode 2 and the cathode 3 has, as shown in FIG. 2, carbon nanotubes 4 that are oriented with an inclination of 60° or less with respect to a planar direction of the electrolyte membrane 1, and a catalyst 5 and an electrolyte resin 6 that are supported on the carbon nanotubes 4. The carbon nanotubes 4 are a representative material of electrically conductive nanocolumns.

The planar direction of the electrolyte membrane 1 is a direction in which a contact surface of the electrolyte membrane 1 with the electrode 2, 3 extends. Furthermore, the carbon nanotubes 4 being oriented with the inclination of 60° or less with respect to the planar direction of the electrolyte membrane 1 refers to a state where the angle formed between the carbon nanotubes 4 and the planar direction of the electrolyte membrane 1 is 60° or less, but does not include a case where the angle between the carbon nanotubes 4 and the planar direction of the electrolyte membrane 1 is 0°. Incidentally, there are many cases where the longitudinal shape of carbon nanotubes is not linear. In such a case, the angle between a carbon nanotube and the planar direction of the electrolyte membrane is defined as the angle formed between a straight line connecting center portions of two opposite end surfaces of the carbon nanotube and the planar direction of the electrolyte membrane.

As shown in FIG. 2, the carbon nanotubes 4 are oriented so that the inclination angle thereof with respect to the planar direction of the electrolyte membrane 1 becomes 60° or less. In this arrangement, the distance between adjacent carbon nanotubes 4 becomes smaller while the distance between the carbon nanotubes along the electrolyte membrane remains substantially the same, in comparison with the case where carbon nanotubes are oriented vertically to the planar direction of the electrolyte membrane.

In consequence, although the carbon nanotubes are disposed on the electrolyte membrane at such intervals (e.g., of about 70 to 100 nm) that the electrolyte resin layers on adjacent carbon nanotubes would not contact each other if the carbon nanotubes were oriented vertically to the planar direction of the electrolyte membrane, the inclined orientation of the carbon nanotubes brings about the contact between the layers of the electrolyte resin 6 coating the surfaces of adjacent carbon nanotubes, and achieves an apparent increased thickness of the electrolyte resin coating the surfaces of the carbon nanotubes 4. That is, the movement of protons between the catalyst and the electrolyte membrane occurs not only in the electrolyte resin coating the carbon nanotube surface on which the catalyst concerned is supported, but also in the electrolyte resin coating the adjacent carbon nanotube surface. Besides, the inclination of the carbon nanotubes shortens the linear distance from the electrolyte membrane surface to the distal end of the carbon nanotubes (the end opposite from the electrolyte membrane).

Thus, the apparent increase of the membrane thickness of the electrolyte resin coating the surfaces of the carbon nanotubes 4 improves the proton conductivity between the catalyst supported on the carbon nanotubes and the electrolyte membrane. Besides, the shortened linear distance from the electrolyte membrane surface to the distal end of the carbon nanotubes means a shortened distance of movement of protons between the catalyst supported on the distal end of the carbon nanotubes and the electrolyte membrane. In consequence, in the anode 2, the protons generated on the catalyst 5 supported at a location remote from the electrolyte membrane 1 can also smoothly move to the electrolyte membrane. In the cathode 3, protons can smoothly move to the catalyst 5 supported at a location remote from the electrolyte membrane 1 as well.

Thus, since the carbon nanotubes 4 supporting the catalyst 5 and the electrolyte resin 6 are oriented with an inclination of 60° or less with respect to the planar direction of the electrolyte membrane 1, the proton conductivity in the anode 2 and in the cathode 3 improves. In consequence, in the fuel cell of the embodiment, the catalyst present at a location remote from the electrolyte membrane can contribute to the electrode reactions, whereas such catalyst does not work effectively in the electrode reactions in the fuel cells having a structure in which carbon nanotubes are oriented vertically to the planar direction of the electrolyte membrane. Hence, according to this embodiment, it is possible to obtain a fuel cell in which the utilization efficiency of the catalyst per unit weight improves and, as the whole fuel cell, the power generation efficiency per unit volume is excellent.

In this embodiment, it may be only one of the anode and the cathode that has an electrode structure as described above. In order to further enhance the effects of this embodiment, it is preferable that both the anode and the cathode have a structure as described above.

The inclination angle of the carbon nanotubes 4 with respect to the planar direction of the electrolyte membrane 1 is not particularly limited as long as it is greater than 0° and less than or equal to 60°. The inclination angle may be suitably determined, taking into account the tube length of the carbon nanotubes, the state of support of the catalyst, etc. Ordinarily, the inclination angle is preferably about 1° to 35° and, particularly, about 10° to 30° from the viewpoint of gas diffusivity. If the inclination angle of the carbon nanotubes is small, the gas diffusivity may sometimes decline.

The configuration of the carbon nanotubes 4, such as the tube diameter, the tube length, etc., is not particularly limited. However, in the light of the amount of catalyst that can be supported, the tube length thereof is preferably 10 to 80 μm. If the tube length is less than 10 μm, the amount of catalyst that can be supported becomes small. On the other hand, if the tube length is greater than 80 μm, there is a risk of impeding the gas diffusion.

The structure of the carbon nanotubes may be of a mono-layer carbon nanotube made by rolling a graphene sheet, or may also be of a multi-layer carbon nanotube made by coaxially nesting a plurality of graphene sheets. Furthermore, as for electrically conductive nanocolumns other than the carbon nanotube, there is no particular limitation as long as the nanocolumn is a narrow and long electrically conductive material with a column diameter of about 5 to 50 nm, a length of about 10 to 80 μm, and an aspect ratio of about 500 to 10,000. Examples of the electrically conductive nanocolumn include a carbon nanohorn.

It is preferable that the carbon nanotube have an amorphous layer on the outer surface. Since the amorphous layer has a larger surface area, a larger amount of catalyst can be supported. Furthermore, the carbon nanotube having an amorphous layer on the surface can restrain aggregation of catalysts on the carbon nanotube surface and concentration of catalyst in a gap between carbon nanotubes, and thus can support catalyst in a uniformly dispersed state on the carbon nanotube surface. Still further, since the amorphous layer has a strong catalyst-supporting property due to a perturbation of the electron cloud, the carbon nanotube having an amorphous layer on the outer surface has a high capability of retaining a catalyst on the outer surface.

The thickness of the amorphous layer is not particularly limited, but is preferably about 0.5 to 10 nm and, particularly, 1 to 3 nm. If the amorphous layer is thinner than 0.5 nm, there is a risk of making it less easy to support the catalyst. If the amorphous layer is thicker than 10 nm, there is a possibility of lowering the electrical conductivity.

As for the catalyst 5 supported on the carbon nanotubes, it is appropriate if the catalyst 5 has a catalytic action in the oxidative reaction of hydrogen in the anode 2 or the reductive reaction of oxygen in the cathode 3. Examples of such a catalyst include metals, such as platinum, ruthenium, iridium, rhodium, palladium, osmium, tungsten, lead, iron, chrome, cobalt, nickel, manganese, vanadium, molybdenum, gallium, aluminum, etc., and alloys thereof, etc. Preferably, the catalyst 5 is platinum, or an alloy of platinum and another metal, for example, ruthenium or the like.

It is preferable that the catalyst be in the form of particles having a particle diameter that is smaller than the tube outside diameter of the carbon nanotubes, and concretely, particles having a particle diameter of 1 to 10 nm and, particularly, 1 to 5 nm.

The electrolyte resin 6 that coats the surfaces of the carbon nanotubes 4 may be a resin that is used in common fuel cells. Examples of the electrolyte resin include fluorine-based electrolyte resins represented by perfluorocarbon sulfonic acid resins, such as Nafion (trade name) and the like, electrolyte resins such as hydrocarbon polymers that have, in their side chains, proton conductive groups, such as a sulfonic acid group, a carboxylic acid group, a boronic acid group, etc., and so on. Preferable examples of the electrolyte resin include perfluorocarbon sulfonic acid resins and the like.

The coating amount of the electrolyte resin on the carbon nanotubes is not particularly limited, and it is appropriate that the coating amount be suitably determined, taking into account the proton conductivity of the electrodes, the gas diffusivity, etc. Ordinarily, it is preferable that the weight ratio between the carbon nanotubes and the electrolyte resin (the weight of the electrolyte resin/the weight of the carbon nanotubes) be about 1 to 6 and, particularly, within the range of 2 to 5. If the weight ratio between the carbon nanotubes and the electrolyte resin becomes large, the gas diffusivity is likely to decline while the proton conductivity becomes high. On the other hand, if the weight ratio between the carbon nanotubes and the electrolyte resin becomes small, the proton conductivity is likely to decline while the gas diffusivity becomes high. At this time, it is preferable that the thickness of the electrolyte resin layer on the carbon nanotube surface be about 5 to 30 nm.

In the fuel cell of this embodiment, the electrodes 2, 3 may contain a component other than the carbon nanotubes 4, the catalyst 5 and the electrolyte resin 6. Furthermore, a gas diffusion layer incorporating a porous electric conductor, such as a carbon paper, a carbon cloth, etc., may be provided between the separator and the layer constructed of the carbon nanotubes 4 that support the catalyst 5 and that are coated with the electrolyte resin 6.

The electrolyte membrane 1 may be an electrolyte membrane that is used in common fuel cells. Examples of the electrolyte membrane include the membranes of fluorine-based electrolyte resins represented by perfluorocarbon sulfonic acid resins, such as Nafion (trade name) and the like, the membranes of electrolyte resins such as hydrocarbon polymers that have, in their side chains, proton conductive groups, such as a sulfonic acid group, a carboxylic acid group, a boronic acid group, etc., the membranes of composite electrolytes containing a strong acid and a basic macromolecule obtained by doping a strong acid into a basic macromolecule such as polybenzimidazole, polypyrimidine, polybenzoxazole, etc. Preferable examples of the electrolyte membrane include perfluorocarbon sulfonic acid resin membranes. The membrane thickness of the electrolyte membrane 1 is not particularly limited, but ordinarily the membrane thickness of about 30 to 70 μm suffices.

It is preferable that an end of the carbon nanotubes 4 be embedded in the electrolyte membrane 1. The "embedded" herein means a state where the end of the carbon nanotubes 4 is sunk from the surface of the electrolyte membrane into the interior to a certain extent. Since the end of the carbon nanotubes 4 is embedded in the electrolyte membrane, the state of junction between the electrolyte membrane 1 and the carbon nanotubes 4 is made firm, and the detachment of the carbon nanotubes from the electrolyte membrane can be prevented. It is appropriate that the length of the carbon nanotubes embedded in the electrolyte membrane be determined taking into account the balance between the length of the embedded portions of the carbon nanotubes and the length of portions of the carbon nanotubes that are not embedded, the supply of the gas to the catalyst supported on the embedded portions, etc. Ordinarily, the length thereof is about 1 to 5 μm.

If an end of the carbon nanotubes 4 is not embedded in the electrolyte membrane 1, it is preferable that an end of the carbon nanotubes be placed in contact with the electrolyte membrane or, if such contact is not provided, the interval between the end of the carbon nanotubes and the electrolyte membrane be less than or equal to 20 nm and the end of the carbon nanotubes and the electrolyte membrane be connected by an electrolyte resin, in order to secure a proton conductivity of the junction portion between the carbon nanotubes and the electrolyte membrane.

A production method for a fuel cell in accordance with a second embodiment of the invention will be described below. Incidentally, the method of producing the fuel cell in the embodiment is not limited to the method described below. Firstly, a substrate supporting metal fine particles (hereinafter, sometimes referred to as "metal fine particle-supporting substrate) is prepared. The substrate may be a silicon substrate, a glass substrate, a quartz substrate, etc. The surfaces of the substrate are washed in accordance with need. Examples of the method of washing the substrate include a process in which heating is performed in a vacuum, and the like.

The metal fine particles serve as nuclei for the growth of carbon nanotubes, and may be iron, nickel, cobalt, manganese, molybdenum, palladiumm etc. A solution containing such a metal and a complex of such a metal is applied to the substrate by a coating process, an electron beam vapor deposition process, etc., so as to form a metal thin membrane on the substrate. By heating the metal thin membrane to about 700 to 750° C. in an inert atmosphere or a reduced pressure, the metal thin membrane turns into particles, so that metal fine particles are supported on the substrate. Ordinarily, it is preferable that the metal fine particles have a particle diameter of about 5 to 20 nm. In order to support metal fine particles having such a particle diameter, it is preferable that the membrane thickness of the metal thin membrane be about 3 to 10 nm.

Next, carbon nanotubes are grown on the substrate. In this carbon nanotube growth step, a material gas is supplied to the metal fine particles on the metal fine particle-supporting substrate while the substrate is disposed in a space of an inert atmosphere at a predetermined temperature that is suitable for the growth of carbon nanotubes (ordinarily, about 700 to 750° C.). The material gas may be, for example, a hydrocarbon-based gas, such as acetylene, methane, ethylene, etc., and so on.

The amount of flow of the material gas, the time of supply thereof, the total amount of supply, etc., are not particularly limited, and it is appropriate that these factors be suitably determined, taking into account the tube length and the tube diameter of the carbon nanotubes, the thickness of the amorphous layer, etc. For example, the length of the carbon nanotubes grown, the thickness of the amorphous layer, etc. differ depending on the concentration of the material gas supplied [the material gas flow amount/(the material gas flow amount+ the inert gas flow amount)]. Specifically, the higher the concentration of the material gas supplied, the greater the thickness of the amorphous layer becomes, and the shorter the length of the carbon nanotubes becomes. Furthermore, during the growth of the carbon nanotubes, soot is generated and deposits around metal fine particles, so that sometimes the supply of the material gas to the metal fine particles may be impeded. The growth of carbon nanotubes progresses with metal fine particles on the substrate serving as nuclei. Therefore, if the supply of the material gas to the metal fine particles is impeded, it is considered that the growth of the carbon nanotubes in a direction of the tube length will stop, and the growth thereof in directions of the tube diameter and the formation of an amorphous layer mainly occur.

In the above-described manner, carbon nanotubes oriented substantially vertically to the planar direction of the substrate are obtained on the substrate. The "carbon nanotubes oriented substantially vertically to the planar direction of the substrate" herein include carbon nanotubes whose shape in the tube length direction is linear and/or non-linear. In the case of carbon nanotubes whose shape in the tube length direction is linear, the angle between the straight line of the linear shape and the planar direction of the substrate is substantially a right angle. In the case of carbon nanotubes in which the shape in the tube length direction is not liner, the angle between a straight line connecting central portions of the two opposite end surfaces of the carbon nanotubes and the planar direction of the substrate is substantially a right angle.

The above-described carbon nanotube growth step employs a CVD method (chemical vapor deposition method) in which carbon nanotubes are formed by bringing about the coexistence of metal fine particles (catalyst metal) and the material gas under a high-temperature condition. However, the method of forming carbon nanotubes is not limited to the CVD method. For example, the carbon nanotubes may also be formed by using a vapor-phase growth method, such as an arc discharge method, a laser evaporation method, etc., or an other known synthetic method.

Next, the catalyst is supported on the carbon nanotubes grown on the substrate. The catalyst support method in the catalyst support step is not particularly limited, and may be performed as either a wet method or a dry method. Examples of the wet method include a method in which after a solution containing a metal salt is applied to the carbon nanotube surface, and the applied solution is subjected to a reductive process by heating it to 200° C. or higher in a hydrogen atmosphere. Examples of the metal salt include halides of the metal exemplified above as catalysts, metal acid halides, inorganic salts of metals, organic acid salts of metals, metal complex salts, etc. The solution containing any of these metal salts may be an aqueous solution or an organic solvent solution. The metal salt solution can be applied to the carbon nanotube surface by, for example, a method in which carbon nanotubes are dipped in the metal salt solution, or a method in which the metal salt solution is dropped or sprayed to the carbon nanotube surface, or the like.

For example, if platinum is used as the catalyst, it is possible to use, in a wet method, a platinum salt solution obtained by dissolving an appropriate amount of chloroplatinic acid, or a platinum nitrate solution (e.g., a dinitrodiamine platinum nitrate solution or the like), or the like in an alcohol such as ethanol, isopropanol, etc. In the light that platinum can be uniformly applied to the carbon nanotube surface, it is particularly preferable to use a platinum salt solution obtained by dissolving a dinitrodiamine platinum nitrate solution in an alcohol. Examples of the dry method include an electron beam evaporation method, a sputtering method, an electrostatic application method, etc.

Next, an electrolyte resin application step of applying an electrolyte resin to the surfaces of the carbon nanotubes supporting the catalyst is performed. The application method for the electrolyte resin is not particularly limited, and examples thereof include a method in which an electrolyte resin solution in which an electrolyte resin is dissolved or dispersed is applied to the carbon nanotube surface by a common method, and a method in which the carbon nanotubes are dipped in an electrolyte resin solution and then are dried, etc. The electrolyte resin may be supported on the carbon nanotube surface by, for example, applying the electrolyte resin, which is already a polymer as mentioned above, or may also be supported on the carbon nanotube surface by, for example, applying to the surfaces of the carbon nanotubes a polymerization composite containing an electrolyte resin precursor and an additive, such as any of various polymerization initiators or the like, in accordance with need, and then is polymerized by irradiation with radiation rays, such as ultraviolet rays or the like, or by heating, after being dried in accordance with need.

Next, the carbon nanotube (supporting the catalyst and coated with the electrolyte resin) oriented vertically on the substrate are thermally transferred to an electrolyte membrane so that the carbon nanotubes are oriented with an inclination of 60° or less with respect to the planar direction of the electrolyte membrane. By adjusting the heating temperature, the applied pressure and the time during which the heating and the pressurization are maintained (transfer time) in the thermal transfer step, the inclination angle of the carbon nanotubes with respect to the planar direction of the electrolyte membrane can be adjusted. Concretely, by heightening the heating temperature or increasing the applied pressure or lengthening the transfer time, the angle of the carbon nanotubes with respect to the planar direction of the electrolyte membrane can be reduced.

The heating temperature is set higher than or equal to the softening temperature of the electrolyte resin supported on the electrolyte membrane and the carbon nanotubes in order that the carbon nanotubes can be provided with a desired inclination angle. However, excessive heating is avoided so that the electrolyte membrane and the electrolyte resin will not degrade and the proton conductivity will not decline. Therefore, the proper heating temperature in the thermal transfer step varies depending on the electrolyte membrane and the electrolyte resin that are used, but ordinarily it is appropriate that the heating temperature be about 120 to 170° C., and preferably, about 130 to 160° C. If a perfluorocarbon sulfonic acid resin is used as the electrolyte membrane and the electrolyte resin, it is preferable that the heating temperature be 140 to 160° C.

The applied pressure is ordinarily about 1 to 10 MPa, and preferably about 2 to 5 MPa. If a perfluorocarbon sulfonic acid resin is used as the electrolyte membrane and the electrolyte resin, it is preferable that the applied pressure be 1 to 5 MPa. The time during which the heating temperature and the applied pressure are maintained (transfer time) is ordinarily about 1 to 30 minutes, and preferably about 5 to 30 minutes. If a perfluorocarbon sulfonic acid resin is used as the electrolyte membrane and the electrolyte resin, it is preferable that the transfer time be 10 to 30 minutes.

While a production method in which the catalyst support step is followed by the electrolyte resin application step and the thermal transfer step in that order has been described, the order of the electrolyte resin application step and the thermal transfer step may be changed. Specifically, the catalyst support step may be followed by the thermal transfer step, in which the carbon nanotubes (already supporting the catalyst) is transferred to the electrolyte membrane, prior to the electrolyte resin application step. In the case where the method of applying a resin in the electrolyte resin application step is a wet method, performance of the electrolyte resin application step after the thermal transfer step may incur a risk that the solvent used to dissolve or disperse the electrolyte resin or a electrolyte resin precursor will swell the electrolyte membrane so that the electrolyte membrane and the thermally transferred carbon nanotubes will be detached from each other. Therefore, in the case where after the catalyst support step, the thermal transfer step is performed and followed by the electrolyte resin application step, it is preferable that the application of the electrolyte resin in the electrolyte resin application step be performed by a dry method.

Furthermore, the electrolyte resin application step is not an essential step, but may be omitted. For example, in the case where in the thermal transfer step the carbon nanotubes are thermally transferred so that about a fifth of the entire length from an end is embedded in the electrolyte membrane, a portion of the vitrified electrolyte membrane permeates surfaces of the carbon nanotubes so that the surfaces of the junction portions between the carbon nanotubes and the electrolyte membrane are coated with the electrolyte resin. Then, as the substrate is detached, the carbon nanotubes are pulled in a direction away from the electrolyte membrane, resulting in a state in which only the end of the carbon nanotubes is embedded in the electrolyte membrane, and the rest thereof is protruded from the surface of the electrolyte membrane. At this time, even if the end of the carbon nanotubes opposite from the electrolyte membrane is not coated with the electrolyte resin, good proton conductivity can be obtained between a portion of the carbon nanotubes that includes the opposite end, and the electrolyte membrane, since the carbon nanotubes are oriented with an inclination to the planar direction of the electrolyte membrane so that the opposite end of the carbon nanotubes becomes closer to the electrolyte membrane surface. Thus, in the case where the electrolyte resin application step is not provided, in order to secure a proton conductivity, it is preferable that the inclination angle of the carbon nanotubes with respect to the planar direction of the electrolyte membrane be 10° or less. Particularly, it is preferable that the carbon nanotubes be inclined so as to achieve a distance of 1 μm or less between the surface of the electrolyte membrane and the end of the carbon nanotubes opposite from the end thereof embedded in the electrolyte membrane.

Ordinarily, the membrane-electrode assembly obtained as described is sandwiched between separators that are made of a commonly used electrically conductive material, such as a carbon material, a metal material, etc., so as to form a fuel cell 100 (see FIG. 1).

[Creation of Membrane-Electrode Assembly]

Example 1

<Step 1>

Firstly, a thin iron membrane having a thickness of 5 nm was formed on a silicon substrate of 50 mm×50 mm by the electron beam evaporation method, and then the silicon substrate was placed in a quartz reaction tube having an inside diameter of 50 mm. Next, a helium gas was caused to flow into the quartz reaction tube at a rate of 200 ml/min, and the temperature was raised to 730° C.

<Step 2>

After the temperature of the quartz reaction tube reached 730° C., an acetylene gas was caused to flow at a rate of 30 ml/min for 10 minutes together with the helium gas (200 ml/min). Subsequently, the inflow of the acetylene gas was stopped, and the quartz reaction tube was cooled to normal temperature. This operation produced carbon nanotubes (CNTs) that were oriented substantially vertically on the silicon substrate. The obtained carbon nanotubes had a weight per unit area of the silicon substrate of 0.2 mg/cm$^2$, and a length of 40 μm. Observation through a transmission electron microscope (by Hitachi Seisakusho) showed that an amorphous layer of about 2 nm was formed on the surfaces of the carbon nanotubes.

<Step 3>

A platinum salt solution having a platinum concentration of 10 g/l was prepared by diluting a dinitrodiamine platinum nitrate solution with ethanol. While the substrate was placed so that the surface having the carbon nanotubes faced upward, 200 μl of the platinum salt solution was dropped so that the amount of the platinum salt solution per unit area of the silicon substrate became uniform (about 8 μl/cm$^2$). Subsequently, a heat treatment was performed at 320° C. for 2 hours in a 4% hydrogen (diluted with an argon gas) atmosphere. By performing the dropping of the platinum salt solution and the heat treatment three times, an electrode precursor in which 0.24 mg/cm$^2$ of a platinum catalyst was supported on the carbon nanotubes oriented vertically on the silicon substrate was obtained.

<Step 4>

An ethanol solution of 10 g/l of a perfluorocarbon sulfonic acid resin (a Nafion solution, EW:1100, by DuPont) was dropped to the obtained electrode precursor so that the amount of the perfluorocarbon sulfonic acid resin (electrolyte resin) per unit area of the silicon substrate became 0.6 mg/cm$^2$ (i.e., so that the perfluorocarbon sulfonic acid resin/ the carbon nanotubes=3 (weight ratio) was achieved). After that, the electrode precursor was dried in vacuum at 140° C.

<Step 5>

A perfluorocarbon sulfonic acid resin membrane of 100 mm×100 mm (trade name: Nafion 112, membrane thickness: 50 μm, by DuPont) was sandwiched between two silicon substrates with the vertically oriented carbon nanotubes (supporting platinum and the electrolyte resin) which were created in Steps 1 to 4. At this time, the two silicon substrates and the perfluorocarbon sulfonic acid resin membrane were superimposed so that the carbon nanotube-formed surfaces faced the perfluorocarbon sulfonic acid resin membrane (hereinafter, sometimes referred to simply as "electrolyte membrane").

Next, the two silicon substrates and the electrolyte membrane superimposed were placed on a hot plate, whose temperature was raised to 150° C. and maintained for 20 minutes while pressurization at 2 MPa was performed. After that, the cooling to normal temperature was performed, and the load was removed. Subsequently, the silicon substrates were detached from the carbon nanotubes, thus obtaining a membrane-electrode assembly in which, on both surfaces of the electrolyte membrane, the carbon nanotubes were oriented with an inclination of 20° C. with respect to the planar direction of the electrolyte membrane. The conditions of creation of the membrane-electrode assembly, the weight of the carbon nanotubes, the inclination angle thereof, the applied amount of the perfluorocarbon sulfonic acid resin, etc. are shown collectively in Table 1.

Example 2

<Steps 1, 2>

These steps are the same as in Example 1.

<Step 3>

A platinum salt solution having a platinum concentration of 30 g/l was prepared by dissolving a chloroplatinic acid in isopropanol. While the substrate was placed so that the surface having the carbon nanotubes faced upward, 200 μl of the platinum salt solution was dropped so that the amount of the platinum salt solution per unit area of the silicon substrate became uniform (about 8 μl/cm$^2$). Subsequently, a heat treatment was performed at 320° C. for 2 hours in a 4% hydrogen (diluted with an argon gas) atmosphere. An electrode precursor in which 0.24 mg/cm$^2$ of a platinum catalyst was supported on the carbon nanotubes oriented vertically on the silicon substrate was obtained.

<Steps 4, 5>

Using the electrode precursor obtained in Step 3, a membrane-electrode assembly was obtained in substantially the same manner as in Example 1. The conditions of creation of the membrane-electrode assembly, the weight of the carbon nanotubes, the inclination angle thereof, the applied amount of the Perfluorocarbon sulfonic acid resin, etc. are shown collectively in Table 1.

Examples 3 to 7

<Steps 1 to 4>

These steps are the same as in Example 1.

<Step 5>

A membrane-electrode assembly was obtained in substantially the same manner as in Example 1, except that the thermal transfer condition was changed as shown in Table 1.

The inclination angle of the carbon nanotubes of each membrane-electrode assembly is shown in Table 1. From Table 1, it can be seen that in conjunction with the thermal transfer of the carbon nanotubes from the silicon substrate where the carbon nanotubes are vertically oriented to the electrolyte membrane, the inclination angle of the carbon nanotubes becomes smaller if the heating temperature is made higher or the applied pressure is made higher or the transfer time is made longer. It also can be seen that in the case where the perfluorocarbon sulfonic acid resin is used as the electrolyte membrane and the electrolyte resin, the inclination angle of the carbon nanotube with respect to the planar direction of the electrolyte membrane can be made less than or equal to 60° by setting the heating temperature at 140 to 160° C., the applied pressure at 1 to 3 MPa, and the transfer time within the range of 10 to 30 minutes. The conditions of creation of the membrane-electrode assembly, the weight of the carbon nanotubes, the inclination angle thereof, the applied amount of the perfluorocarbon sulfonic acid resin, etc. are shown collectively in Table 1.

Examples 8 to 16

<Step 1>

This step is the same as in Example 1.

<Step 2>

Carbon nanotubes were produced on the silicon substrate in substantially the same manner as in Example 1, except that the amount of flow of the acetylene gas and the inflow time were changed as shown in Table 1. The weight per unit area of the silicon substrate (mg/cm$^2$) and the length (μm) of the obtained carbon nanotubes, and the thickness of the amorphous layer (nm) are shown in Table 1.

<Steps 3 to 5>
These steps are the same as in Example 1.

Examples 17 to 19

<Steps 1 to 3>
These steps are the same as in Example 1.
<Step 4>
This step was performed in substantially the same manner as in Example 1, except that an ethanol solution having a perfluorocarbon sulfonic acid resin concentration of 10 g/l (a Nafion solution, EW:1100, by DuPont) was dropped to an electrode precursor so that the amount of the perfluorocarbon sulfonic acid resin per unit area of the silicon substrate (mg/cm$^2$) became equal to an amount shown in Table 1. The perfluorocarbon sulfonic acid resin/carbon nanotube (weight ratio) of each of Examples is shown in Table 1.
<Step 5>
This step is the same as in Example 1.

COMPARATIVE EXAMPLE

<Steps 1 to 4>
These steps are the same as in Example 1.
<Step 5>
An membrane-electrode assembly was obtained in substantially the same manner as in Example 1, except that the thermal transfer condition was changed as shown in Table 1 so that the carbon nanotubes were oriented at a right angle (90°) with respect to the planar direction of the electrolyte membrane.

[Evaluation of Power Generation Performance of Membrane-Electrode Assembly]

With regard to the membrane-electrode assemblies of Examples 1 to 19 and Comparative Example obtained as described above, the current densities at 0.8 V and 0.6 V were measured in the following conditions. Results of the measurement are shown in Table 2.

TABLE 2

| <Power Generation Performance Test Conditions> | |
|---|---|
| Fuel gas: | pure hydrogen (273 ml/min) |
| Oxidant gas: | air (866 ml/min) |
| Pressure: | 0.2 MPa |
| Temperature: | 80° C. |
| Humidity: | 100% RH |

| | Power Gen. Performance Eva. | |
|---|---|---|
| | Current Density at 0.8 V (A/cm$^2$) | Current Density at 0.6 V (A/cm$^2$) |
| Example 1 | 0.14 | 1.3 |
| Example 2 | 0.08 | 1.05 |
| Example 3 | 0.12 | 1.22 |

TABLE 1

| | Acetylene Gas Flow (ml/min) | Acetylene Gas Inflow Time (min) | Acetylene Gas Supply (ml) | Thickness of Amorphous Layer (nm) | Length of CNT (μm) | Unit Area Weight of CNT (mg/cm$^2$) | Applied Amount of Nafion (mg/cm$^2$) | Nafion/CNT | Thermal Transfer Conditions Temp. (° C.) | Press. (MPa) | Time (min) | CNT Inclination Angle (°) |
|---|---|---|---|---|---|---|---|---|---|---|---|---|
| Example 1 | 30 | 10 | 300 | 2 | 40 | 0.2 | 0.6 | 3 | 150 | 2 | 20 | 20 |
| Example 2 | 30 | 10 | 300 | 2 | 40 | 0.2 | 0.6 | 3 | 150 | 2 | 20 | 20 |
| Example 3 | 30 | 10 | 300 | 2 | 40 | 0.2 | 0.6 | 3 | 140 | 2 | 20 | 60 |
| Example 4 | 30 | 10 | 300 | 2 | 40 | 0.2 | 0.6 | 3 | 160 | 2 | 20 | 10 |
| Example 5 | 30 | 10 | 300 | 2 | 40 | 0.2 | 0.6 | 3 | 150 | 3 | 20 | 15 |
| Example 6 | 30 | 10 | 300 | 2 | 40 | 0.2 | 0.6 | 3 | 150 | 2 | 10 | 30 |
| Example 7 | 30 | 10 | 300 | 2 | 40 | 0.2 | 0.6 | 3 | 150 | 2 | 30 | 15 |
| Example 8 | 37.5 | 10 | 375 | 3 | 10 | 0.05 | 0.15 | 3 | 150 | 2 | 20 | 20 |
| Example 9 | 35 | 10 | 350 | 2.5 | 20 | 0.1 | 0.3 | 3 | 150 | 2 | 20 | 20 |
| Example 10 | 32.5 | 10 | 325 | 2 | 30 | 0.2 | 0.6 | 3 | 150 | 2 | 20 | 20 |
| Example 11 | 27.5 | 10 | 275 | 1.8 | 50 | 0.2 | 0.6 | 3 | 150 | 2 | 20 | 20 |
| Example 12 | 25 | 10 | 250 | 1.7 | 60 | 0.2 | 0.6 | 3 | 150 | 2 | 20 | 20 |
| Example 13 | 22.5 | 10 | 225 | 1.5 | 70 | 0.2 | 0.6 | 3 | 150 | 2 | 20 | 20 |
| Example 14 | 20 | 10 | 200 | 1 | 80 | 0.2 | 0.6 | 3 | 150 | 2 | 20 | 20 |
| Example 15 | 30 | 3 | 90 | — | 40 | 0.1 | 0.3 | 3 | 150 | 2 | 20 | 20 |
| Example 16 | 20 | 20 | 400 | 3 | 40 | 0.3 | 0.9 | 3 | 150 | 2 | 20 | 20 |
| Example 17 | 30 | 10 | 300 | 2 | 40 | 0.2 | 0.4 | 2 | 150 | 2 | 20 | 20 |
| Example 18 | 30 | 10 | 300 | 2 | 40 | 0.2 | 0.8 | 4 | 150 | 2 | 20 | 20 |
| Example 19 | 30 | 10 | 300 | 2 | 40 | 0.2 | 1.0 | 5 | 150 | 2 | 20 | 20 |
| Comp. Ex. | 30 | 10 | 300 | 2 | 40 | 0.2 | 0.6 | 3 | 130 | 2 | 20 | 90 |

-continued

|  | Power Gen. Performance Eva. | |
|---|---|---|
|  | Current Density at 0.8 V (A/cm$^2$) | Current Density at 0.6 V (A/cm$^2$) |
| Example 4 | 0.14 | 1.25 |
| Example 5 | 0.14 | 1.24 |
| Example 6 | 0.14 | 1.27 |
| Example 7 | 0.14 | 1.28 |
| Example 8 | 0.08 | 1.12 |
| Example 9 | 0.14 | 1.3 |
| Example 10 | 0.14 | 1.3 |
| Example 11 | 0.16 | 1.31 |
| Example 12 | 0.16 | 1.32 |
| Example 13 | 0.13 | 1.29 |
| Example 14 | 0.12 | 1.23 |
| Example 15 | 0.13 | 1.25 |
| Example 16 | 0.12 | 1.24 |
| Example 17 | 0.12 | 1.18 |
| Example 18 | 0.12 | 1.25 |
| Example 19 | 0.12 | 1.24 |
| Comp. Ex. | 0.11 | 1.13 |

Example 1, Examples 3 to 7 and Comparative Example were produced in substantially the same conditions, except that the inclination angle of the carbon nanotubes was varied. As shown in Table 2, Example 1 and Examples 3 to 7, in which the carbon nanotubes were oriented at an inclination angle of 60° or less with respect to the planar direction of the electrolyte membrane, were more excellent in the power generation performance than Comparative Example, in which the carbon nanotubes were oriented vertically with respect to the planar direction of the electrolyte membrane. In Example 2 and Example 8 to Example 19, while the inclination angle of the carbon nanotubes with respect to the planar direction of the electrolyte membrane was less than or equal to 60°, the production conditions for the carbon nanotubes were changed from those in Example 1 so that the length of the carbon nanotubes or the thickness of the amorphous layer was changed, or the applied amount of the electrolyte resin was changed, or the kind of platinum salt used in the catalyst support step was changed, etc. All of these examples exhibited good power generation performance. Observation of the carbon nanotubes of Example 1 and Example 2 through a transmission electron microscope (by Hitachi Seisakusho) showed that the carbon nanotubes of Example 1 supported platinum more uniformly on their surfaces than the carbon nanotubes of Example 2. A reason for this is considered to be that the dinitrodiamine platinum nitrate solution used in the platinum support step of Example 1 was higher in the affinity to the CNTs than the chloroplatinate solution used in the platinum support step of Example 2, and therefore was better dispersed on the surfaces of the CNTs. It is speculated that this caused the difference in the power generation performance between Example 1 and Example 2.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. A fuel cell comprising:
an electrolyte membrane;
a first electrode disposed on a surface of the electrolyte membrane; and
a second electrode which is disposed on another surface of the electrolyte membrane and which has a plurality of electrically conductive nanocolumns oriented in one direction with an inclination of 60° or less with respect to a planar direction of the electrolyte membrane, a catalyst supported on the electrically conductive nanocolumns, and an electrolyte resin coating the electrically conductive nanocolumns;
wherein the electrically conductive nanocolumns have, on an outer surface thereof, an amorphous layer;
wherein a thickness of the amorphous layer is greater than or equal to 0.5 nm and less than or equal to 10 nm; and
wherein portions of the electrically conductive nanocolumns that contact the electrolyte membrane are oriented with an inclination of 60° or less with respect to the planar direction of the electrolyte membrane.

2. The fuel cell according to claim 1, wherein an end of the electrically conductive nanocolumns is embedded in the electrolyte membrane.

3. The fuel cell according to claim 1, wherein a thickness of the amorphous layer is greater than or equal to 1 nm and less than or equal to 3 nm.

4. The fuel cell according to claim 1, wherein the electrically conductive nanocolumns are made of an electrically conductive material and have a column diameter greater than or equal to 5 nm and less than or equal to 50 nm, a length greater than or equal to 10 μm and less than or equal to 80 μm, and an aspect ratio greater than or equal to 500 and less than or equal to 10,000.

5. The fuel cell according to claim 1, wherein the electrically conductive nanocolumns are carbon nanotubes.

6. The fuel cell according to claim 1, wherein the plurality of electrically conductive nanocolumns are oriented in one direction with an inclination that is greater than or equal to 1° and less than or equal to 35° with respect to the planar direction of the electrolyte membrane.

7. The fuel cell according to claim 6, wherein the plurality of electrically conductive nanocolumns are oriented with an inclination that is greater than or equal to 10° and less than or equal to 30° with respect to the planar direction of the electrolyte membrane.

8. The fuel cell according to claim 1, wherein the electrolyte resin is a fluorine-based electrolyte resin.

9. The fuel cell according to claim 8, wherein the fluorine-based electrolyte resin is a perfluorocarbon sulfonic acid resin.

10. The fuel cell according to claim 1, wherein the electrolyte resin is a hydrocarbon polymer that has a proton conductive group in a side chain.

11. The fuel cell according to claim 1, wherein each of the electrically conductive nanocolumns is oriented with an inclination of 60° or less with respect to the planar direction of the electrolyte membrane.

* * * * *

UNITED STATES PATENT AND TRADEMARK OFFICE
CERTIFICATE OF CORRECTION

PATENT NO. : 8,486,583 B2  Page 1 of 1
APPLICATION NO. : 12/293667
DATED : July 16, 2013
INVENTOR(S) : Nakanishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this
Eighth Day of September, 2015

Michelle K. Lee
*Director of the United States Patent and Trademark Office*